Sept. 15, 1925.

H. D. JAMES ET AL 1,553,380

CONTROL APPARATUS

Filed Feb. 3, 1923    2 Sheets-Sheet 1

WITNESSES:
R. J. Butler.
M. Keith

INVENTORS
Henry D. James &
Walter C. Goodwin.
BY
Wesley G. Carr
ATTORNEY

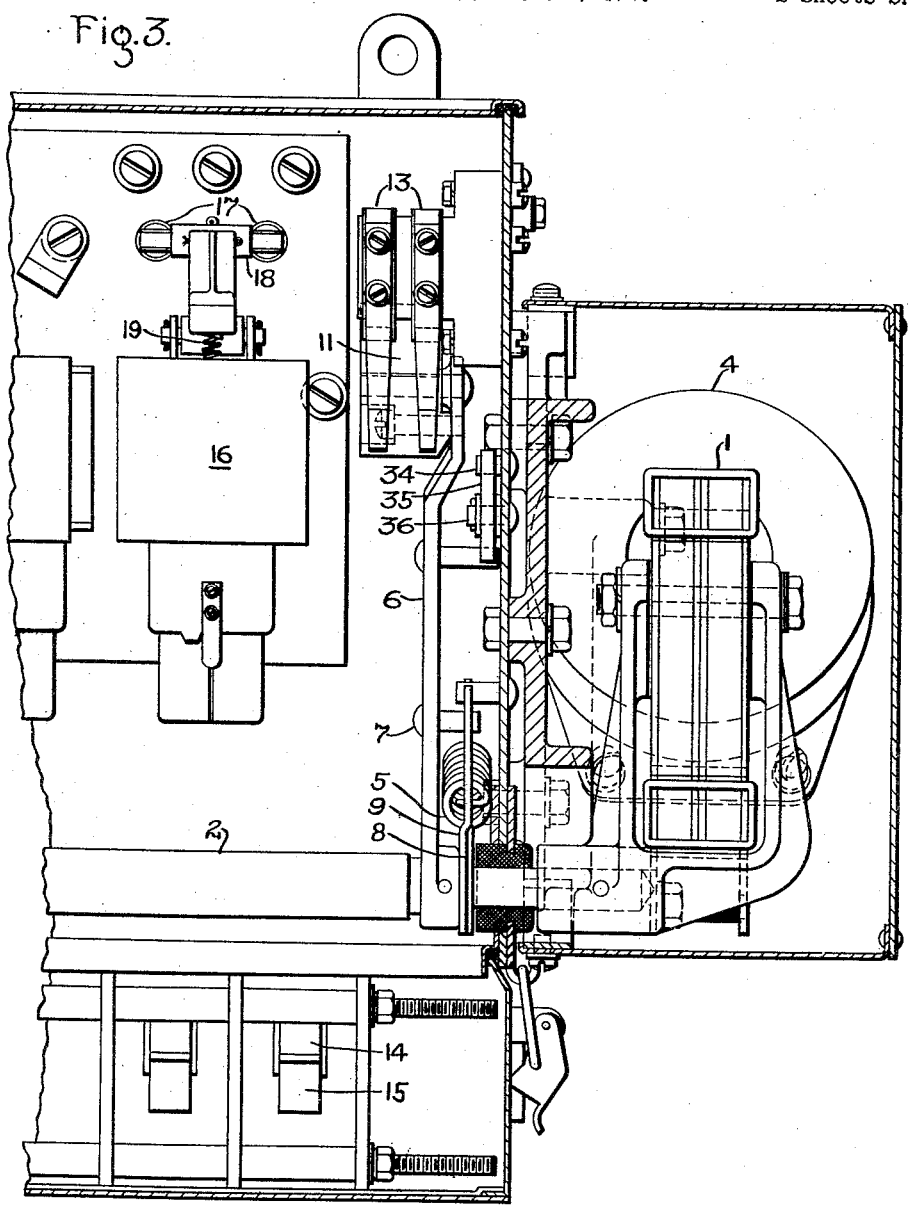

Patented Sept. 15, 1925.

1,553,380

UNITED STATES PATENT OFFICE.

HENRY D. JAMES, OF EDGEWOOD PARK, AND WALTER C. GOODWIN, OF PITTSBURGH, PENNSYLVANIA, ASSIGNORS TO WESTINGHOUSE ELECTRIC AND MANUFACTURING COMPANY, A CORPORATION OF PENNSYLVANIA.

CONTROL APPARATUS.

Application filed February 3, 1923. Serial No. 616,729.

*To all whom it may concern:*

Be it known that we, HENRY D. JAMES, a citizen of the United States, and a resident of Edgewood Park, in the county of Allegheny and State of Pennsylvania, and WALTER C. GOODWIN, a citizen of the United States, and a resident of Pittsburgh, in the county of Allegheny and State of Pennsylvania, have invented a new and useful Improvement in Control Apparatus, of which the following is a specification.

Our invention relates to electrical control apparatus and it has particular relation to devices employed for controlling alternating-current motors of the induction type.

The object of our invention is to provide a simple and effective form of remotely controlled means for starting and stopping squirrel cage motors and for limiting the starting current supplied thereto.

Our invention comprises a controller of the type described in United States Patent No. 1,354,193, granted to Henry D. James and assigned to the Westinghouse Electric & Manufacturing Company. The present invention, however, embodies a novel form of electroresponsive means instead of manual means for operating the controller.

Figure 1:
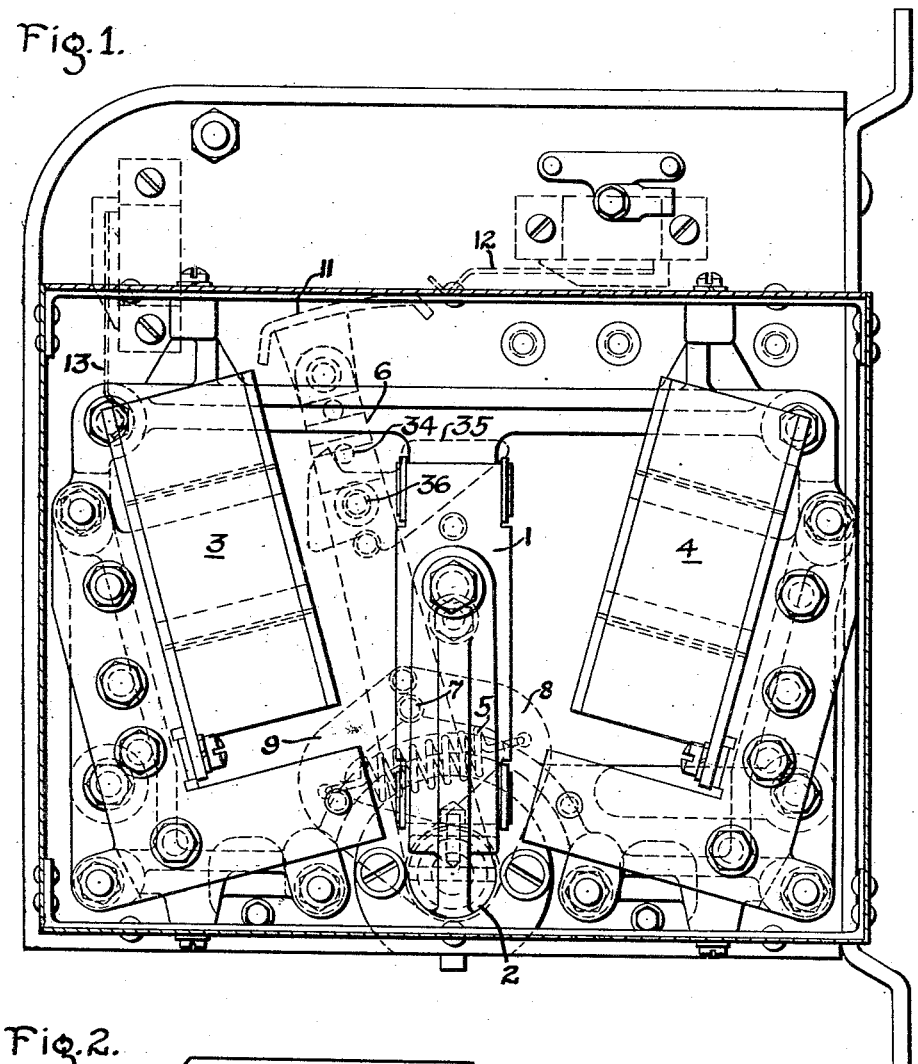
Figure 2:
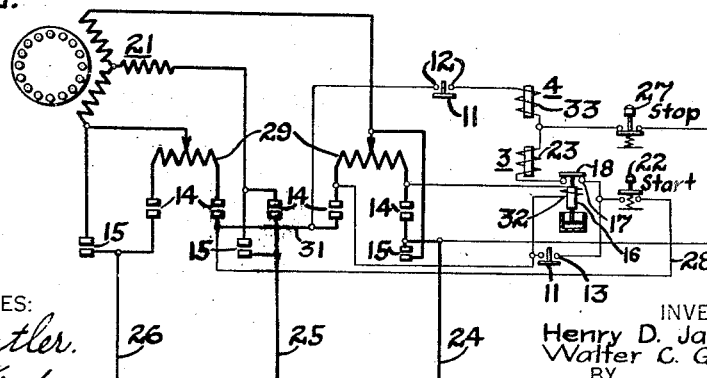

Our invention will be described in connection with the accompanying drawings in which, Figure 1 is a view in elevation illustrating particularly electroresponsive operating means constructed in accordance with our invention, Fig. 2 is a diagrammatic representation of circuits and apparatus embodying our invention, and Fig. 3 is another view of the apparatus illustrated in Fig. 1 and represents more particularly the relation of the operating mechanism to the controller.

Referring to the drawings, an armature 1 is rigidly mounted upon a shaft 2 and is disposed between electromagnets 3 and 4. These electromagnets are provided for actuating the armature 1 and for rotating the shaft 2 in a clockwise or counter-clockwise direction against the action of a centering device comprising a spring 5, which normally biases the armature 1 to its illustrated position. The centering device is more particularly described and illustrated in the above-mentioned patent. This device is connected with the armature 1 by means of a lever 6, which rotates with the shaft 2 and has a pin projection 7 for engaging centering arms 8 and 9. On the upper end of the lever 6 is mounted a contact member 11 that is so disposed as to alternately engage pairs of stationary contact members 12 and 13, in accordance with the direction of rotation of the shaft 2.

When the magnet 3 is energized, the armature 1 rotates the shaft 2 in a counter-clockwise direction, thereby causing contact member 11 to engage contact members 13. When the magnet 3 is deenergized, the armature 1 is released and is returned by means of the centering spring 5 toward its normal position. The armature 1, however, overtravels or swings beyond the normal position and unless restrained, will be oscillated by means of the centering spring.

According to our invention, advantage is taken of this oscillation by so disposing contact members 11 and 12 that when the armature 1 rotates in a clockwise direction, contact member 11 engages contact members 12, whereby a circuit may be completed for the electromagnet 4 from a suitable source of energy. The armature 1 is thereupon attracted by the magnet 4 and is maintained in engagement therewith until the supply of energy is interrupted.

As illustrated and described in the previously mentioned patent, shaft 2 is arranged for operating suitable starting and running switches in a well-known manner. These starting and running switches 14 and 15, respectively, are arranged in the usual motor connections, as diagrammatically illustrated in Fig. 2. A time element relay 16 of a familiar type is provided with stationary contact members 17 and a movable bridging contact member 18. The contact member 18 is maintained normally in engagement with contact member 17 by means of a spring 19. A relay of suitable design is illustrated in United States Patent No. 1,414,413, granted to Charles H. Hodgkins and assigned to Westinghouse Electric & Manufacturing Company.

The operation of our controller will be clearly understood from an inspection of Fig. 2. With the controller in its illustrated inoperative position, a motor 21, to be controlled, may be started by momentarily depressing a push button switch 22. A circuit for the operating coil 23 of the electromagnet 3 is provided from a source of energy comprising line conductors 24, 25 and 26. A circuit is thereupon established from line conductor 24 through stop-switch 27, coil 23, contact members 17 and 18, switch 22 and conductor 28 to line conductor 25. The armature 1 is now attracted by the coil 23, to rotate operating shaft 2 and close starting switches 14. The closure of starting switches 14 connects the motor 21 to line conductors 24, 25 and 26 through auto-transformer windings 29 in a familiar manner. A holding circuit for coil 23 extends from line conductor 24 through switch 27, coil 23, contact members 17, 18, 13 and 11, conductor 31 and switch 14 to line conductor 25.

Time-element relay 16 is next actuated to interrupt the starting connections. A circuit for the operating coil 32 of this relay extends from line conductor 24 through switch 14, coil 32, conductor 31 and switch 14 to line conductor 25. After a predetermined interval contact member 18 of relay 16 disengages stationary contact members 17, thereby deenergizing coil 23, whereupon armature 1 rotates toward the running magnet 4 and opens starting switches 14. The oscillatory movement of armature 1 is sufficient to effect engagement of contact members 11 and 12, which completes a circuit extending from line conductor 24 through switch 27, coil 33 of electromagnet 4, and contact members 11 and 12 to line conductor 25. The energization of electromagnet 4 attracts the armature 1, closing running switches 15, whereby motor 21 is connected directly to line conductors 24, 25 and 26, auto-transformer windings 29 having been disconnected, upon the opening of starting switches 14.

The motor will continue to operate until the stop switch 27 is opened in the customary manner to deenergize the running magnet 4. In order to thereafter prevent reclosing of the running switches 15, lever 6 when moved in a counter-clockwise direction engages, through a pin 34, a counterweighted member 35 that is pivotally mounted for rotation upon a pivot 36. This arrangement provides a mechanical means for damping the oscillations of the armature 1 and thereby prevents contact member 11 from reengaging member 12.

According to our invention we employ simple and efficient means for remotely controlling induction motors. The tendency of the magnet armature to overtravel from its starting toward its running position is utilized to thereby automatically establish the running connections at a predetermined time after the motor starting connections have been established. While our invention is peculiarly adapted for controlling induction motors, it may readily be employed for other purposes.

We claim as our invention:

1. A motor controller comprising starting and running switches, an oscillatory armature for actuating the switches, means tending to maintain the armature in starting position and means controlled by the oscillation of said armature for actuating said armature to running position.

2. A motor controller comprising starting and running switches, a member capable of oscillatory movement for actuating the switches, electromagnetic means for actuating said member to starting position, means for oscillating said member and means controlled by said oscillation for restraining said member in running position.

3. A motor controller comprising starting and running switches, actuating means therefor comprising an armature normally biased to an inoperative position, starting and running coils for actuating the armature, means comprising the biasing means for returning said armature from starting position toward running position and beyond its normal position, and means actuated thereby for closing a circuit to said running coil.

4. A motor controller comprising starting and running switches, an armature for controlling the switches, a coil for actuating the armature to starting position, a relay for thereafter deenergizing the coil, means for oscillating said armature and means controlled by said oscillation for actuating said armature to running position.

5. A motor controller comprising starting and running switches, an armature for controlling the switches, a coil for actuating the armature to starting position, a time element relay for thereafter deenergizing the coil, a centering device, means comprising the centering device for oscillating said armature and means controlled by said oscillation for actuating said armature to running position.

6. A motor controller comprising starting and running switches, an armature for controlling the switches, a coil for actuating the armature to starting position, a time element relay for thereafter deenergizing the coil, a centering device, means comprising the centering device for oscillating said armature and electroresponsive means controlled by said oscillation for actuating said armature to running position.

7. A motor controller comprising starting and running switches, an armature for controlling the switches, a coil for actuating the armature to starting position, a time element relay for thereafter deenergizing the coil, a centering device, means comprising the centering device for oscillating said armature and electroresponsive means comprising a coil and a switch therefor controlled by said oscillation for actuating said armature to running position.

In testimony whereof, we have hereunto subscribed our names this 25th day of January, 1923.

HENRY D. JAMES.
WALTER C. GOODWIN.